United States Patent [19]

Harned et al.

[11] 4,133,475
[45] Jan. 9, 1979

[54] ENGINE SPARK TIMING SYSTEM WITH KNOCK RETARD AND WIDE OPEN THROTTLE ADVANCE

[75] Inventors: John L. Harned, Grosse Pointe Woods; Thomas C. Wolanzyk, Howell, both of Mich.

[73] Assignee: General Motors Corporation, Detroit, Mich.

[21] Appl. No.: 759,720

[22] Filed: Jan. 17, 1977

[51] Int. Cl.² ............................................. F02P 5/04
[52] U.S. Cl. .................................. 123/117 D; 73/35
[58] Field of Search ...................... 123/117 D, 148 E; 73/35

[56] References Cited

U.S. PATENT DOCUMENTS

| | | | |
|---|---|---|---|
| 3,950,981 | 4/1976 | Arrigoni et al. | 73/35 |
| 4,002,155 | 1/1977 | Harned et al. | 73/35 |
| 4,012,942 | 3/1977 | Harned | 73/35 |
| 4,061,116 | 12/1977 | Saida et al. | 123/117 D |

*Primary Examiner*—Samuel Feinberg
*Attorney, Agent, or Firm*—Robert M. Sigler

[57] ABSTRACT

In a spark ignition internal combustion engine with power output controlled by a throttle, a throttle switch provides a wide open throttle signal and a knock sensor provides a knock level signal. A normal spark pulse train, corrected for intake manifold vacuum, engine speed and dwell angle, is fed through a shift register which delays each spark pulse by a fixed number of counts. A pulse train generator responsive to crankshaft rotation produces a crankshaft reference angle pulse each fixed number of degrees of crankshaft rotation; and these pulses are counted by the shift register to provide a normal spark timing. First and second up-down counters are responsive to the knock detector, the first up-down counter counting up with excessive knock and being effective to delay the counting of the shift register by a period proportional to its count, the second up-down counter being responsive to the wide open throttle switch to count downward with excessive knock and insert extra pulses between the pulses of the pulse train generator in number proportional to its count to advance spark from the normal setting.

2 Claims, 4 Drawing Figures

ENGINE SPARK TIMING SYSTEM WITH KNOCK RETARD AND WIDE OPEN THROTTLE ADVANCE

BACKGROUND OF THE INVENTION

Passenger vehicles equipped with spark ignition internal combustion engines operate under widely varying conditions. In order to prevent engine knock over their full range of operation, present ignition systems require that spark timing be significantly retarded from the values yielding best fuel economy and maximum power. In U.S. Patent application Ser. No. 648,313, filed Jan. 12, 1976 by John L. Harned and Donald F. Herrick and assigned to the assignee of this application, a spark timing system is described which includes an engine knock sensor and means to retard spark timing in response to an excess knock signal from the sensor, with the result that the normal spark timing can be set somewhat in advance of the values presently used in order to obtain improved fuel economy and power.

However, although fuel economy and engine power generally improve with advancing spark timing up to the point of maximum acceptable knock, it is found that there is generally an engine spark timing between such maximum knock limited advance and the present normal setting which gives optimum low engine emission characteristics. Thus, an engine with the previously described knock limited spark timing system is normally adjusted with spark timing at the optimum emission values with a closed loop spark retard which only operates with excessive knock. The system, so used, improves fuel economy and power over that of the same engine as presently used; however, it still does not make the most efficient use of the engine. In particular, it is desirable to provide automatic spark advance from the normal settings, when knock is not present, to obtain maximum engine power with wide open throttle, when such power is needed, for example, in passing or accident avoidance situations.

SUMMARY OF THE INVENTION

This invention relates to a spark timing system for a spark ignition internal combustion engine which includes a normal spark timing system with vacuum and centrifugal advance but modified with the addition of means effective to retard the spark from the normal setting in a spark retard mode in the case of excessive knock and further means effective upon wide open throttle operation to advance the spark timing from the normal settings in a spark advance mode to a programmed limit or a value limited by excessive knock. The system includes means for delaying each normal spark pulse in a shift register by a fixed number of counts, the counts corresponding to degrees of crankshaft revolution, and delaying the onset of counting in the shift register for retard from the normal setting or inserting extra counts into the normal count succession for advancing from the normal settings. The amount of advance or retard is controlled by a pair of up-down counters which regularly renew their counts in accordance with the output of a knock detector which senses and signals the existence of excessive or acceptable knock levels in the engine. The spark pulses, as delayed by the shift register, are supplied through the distributor to the engine spark plugs and the normal spark timing is adjusted for optimum engine operation under normal operating conditions.

Further details and advantages of this invention will be apparent from the accompanying drawings and following description of a preferred embodiment.

DESCRIPTION OF THE PREFERRED EMBODIMENT

Figure 1:
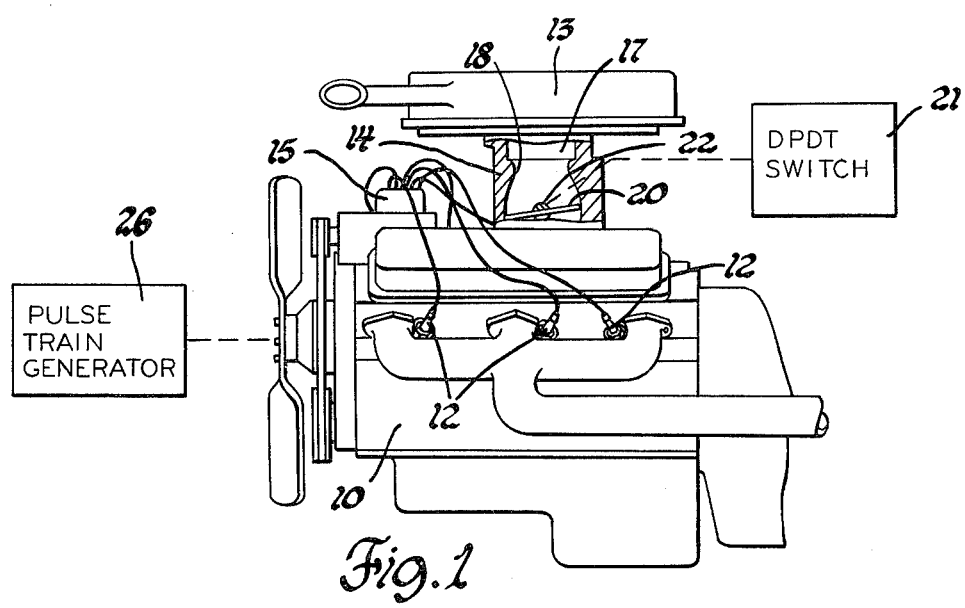
FIG. 1 shows an engine modified by this invention.

Referring to FIG. 1, an internal combustion engine 10 has a plurality of cylinders with a spark plug 12 for each cylinder. Air is obtained from the atmosphere through air cleaner 13 and mixed with controlled quantities of fuel in a carburetor 14, from which it is drawn through an intake manifold, not shown, into the cylinders for ignition by the spark plugs at controlled times.

Figure 2:
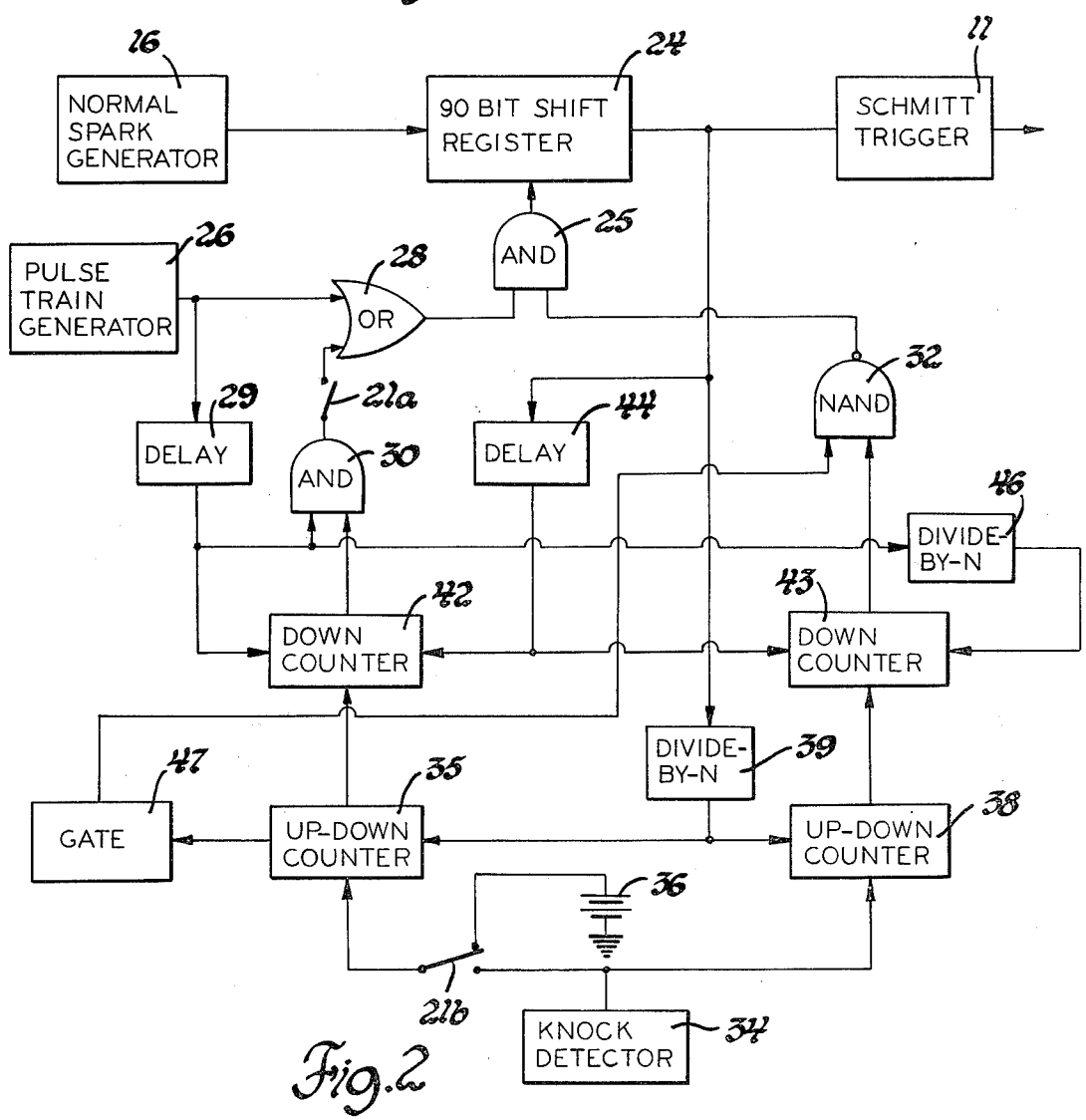
FIG. 2 shows a block diagram of the spark timing system of this invention.

A standard ignition system for spark plugs 12 includes a distributor 15, which can be of the type shown in the U.S. Pat. No. to Falge 3,254,247. Distributor 15 includes means for generating spark timing pulses in time with engine rotation, means for advancing or retarding these pulses in response to engine speed and intake manifold vacuum, means as shown in the U.S. Pat. No. to Richards et al 3,838,672 to use these pulses to create high voltage output pulses from a spark coil and means to distribute the high voltage output pulses from the spark coil to the spark plugs 12 in a predetermined sequence. In FIG. 2, the normal spark generator 16 includes the first portion of this standard system, including the pulse generating means, the speed and vacuum advance means and sufficient circuitry to compute dwell time and generate an output wave form which jumps between two predetermined output levels at the times when current in the spark coil is desired to be turned on and off. The output of generator 16 would correspond to lead 38 in the aforementioned Richards et al reference. In the normal spark timing system, as shown in Richards et al, the output of the normal spark generator 16 would be applied directly to a Schmitt trigger circuit controlling current through the spark coil and would thus time the firings of spark plugs 12. In this invention, an additional system is inserted between normal spark generator 16 and the Schmitt trigger circuit 11 in FIG. 2.

Carburetor 14 includes an induction passage 17 with a venturi region 18 and a throttle valve 20 below venturi region 18. Carburetor 14 is of the normal type in which fuel is added to the intake air in venturi region 18 in controlled proportion and the rate of flow of the resulting air-fuel charge to engine 10 is controlled by the rotational position of throttle valve 20, which can vary from a closed position shown in FIG. 1 to a wide open throttle position in which maximum air-fuel charge is delivered to engine 10 for maximum power therefrom. The normal carburetor 14 is modified by the inclusion of switch means, in this embodiment a double-pole, double-throw switch 21, which could be mounted externally of carburetor 14 and actuated by the throttle valve shaft 22. Switch 21 is linked to throttle valve 20 in such a way as to assume a wide open throttle position when throttle valve 20 is wide open and a normal position at all other times. For convenience, FIG. 2 shows the separate arms of switch 21 in separate places as switches 21a and 21b; however, it is understood that these switches 21a and 21b are ganged together for co-movement between the normal position shown and the wide open throttle position as previously described.

In order to provide advance as well as retard from the normal spark pulses, it has been found convenient to delay the application of each normal spark pulse to a spark plug by the normal crankshaft angle between two successive normal spark pulses. In an eight cylinder engine, the required crankshaft angle is 90° of crankshaft rotation, since four spark plugs fire on each rotation of the crankshaft. Thus, FIG. 2 shows that the output of normal spark generator 16 is supplied to a 90-bit shift register 24 which receives each jump between voltage levels, stores it internally while counting ninety clock pulses from the rest of the circuit through an AND gate 25 and outputs said voltage change on the ninetieth counted pulse to the Schmitt trigger and spark coil. The 90-bits counted by shift register 24 are appropriate to a V-eight cylinder engine with clock pulses at the normal rate of one pulse per degree of crankshaft rotation. Naturally, a different engine or clock pulse rate might require a different number of bits to be counted by shift register 24. In addition, a different device than a shift register could be used to provide the required delay, but a shift register is a convenient device for the purpose and is also the specific device that would be used within a general purpose digital computer or microcomputer should such a device be programmed to perform the functions of the discrete components shown in FIG. 2. During the description of this preferred embodiment, it is to be understood that the combination of discrete digital electronic devices shown could be duplicated by the appropriately programmed general purpose digital computer or microcomputer; and that this invention includes such a digital computer so programmed as an equivalent of the combination shown herein.

A pulse train generator 26 produces an output train of pulses in time with engine crankshaft rotation such as, for example, one pulse per degree of crankshaft rotation. Means for generating such a train of pulses are well known in the art and could comprise, as in the aforementioned Harned et al reference, a toothed wheel rotating with the crankshaft, a magnetic pickup and amplification means to generate pulses in time with the passing teeth of the wheel. The output of pulse train generator 26 is supplied to one input of an OR gate 28, the output of which is supplied to one input of AMD gate 25.

The output of pulse train generator 26 is also supplied through delay means 29 to one input of AND gate 30, the output of which is connected through switch 21a, when closed, to the other input of OR gate 28. Delay means 29 provides a delay of less than one engine crankshaft degree to the clock pulses from pulse train generator 26 so that, when switch 21a is closed and AND gate 30 is in condition to pass pulses from delay means 29, these pulses are, in effect, inserted between the non-delayed pulses from generator 26 by OR gate 28 and two pulses per degree of crankshaft rotation are passed to AND gate 25. This may be seen graphically in FIG. 3, wherein wave form 26a represents the output of pulse train generator 26, wave form 30a represents the output of AND gate 30 and wave form 28a represents the output of OR gate 28 with switch 21a closed. (Due to limited space and a desire for clarity, the wave forms assume a shift register 24 which counts 20 bits rather than 90, but the description will continue in terms of 90 bits) Provided that AND gate 25 is in condition to pass the pulses from OR gate 28, shift register 24 will count its ninety pulses before the crankshaft is rotated 90° and the output wave form of normal spark generator 16, shown as wave form 16a in FIG. 3, will be repeated in the output of shift register 24, shown as trace 24a in FIG. 3, advanced in crankshaft angle from the position it would have assumed, shown by the dashed lines in wave form 24a, had no additional pulses from AND gate 30 been passed to OR gate 28. The amount of advance, in degrees of crankshaft rotation, is seen in this embodiment to be the same as the number of pulses in wave form 30a that are passed through switch 21a to OR gate 28.

The other input to AND gate 25 is connected to the output of a NAND gate 32. NAND gate 32 controls the passage of pulses through AND gate 25 by allowing the passage of such pulses when its output is high and preventing the passage of such pulses when its output is low. This is illustrated in the wave forms of FIG. 4, wherein wave form 16b shows the output of normal spark generator 16, 28b shows the output of OR gate 28 with switch 21a open, wave form 32b shows the output of NAND gate 32, wave form 25b shows the output of AND gate 25 and wave form 24b shows the resulting output of shift register 24 (once again shown as if it were a 20-bit shift register). It can be seen that the closure of AND gate 25 causes a number of pulses from OR gate 28 not to be counted by shift register 24 and that wave form 24b is thus retarded from a position of 90 degrees of crankshaft revolution after wave form 16b, shown in the dashed line of wave form 24b, which it would have assumed had AND gate 25 not been closed. The amount of such retard is, in this embodiment, equal in degrees of crankshaft rotation to the number of pulses skipped while AND gate is closed.

A knock detector 34 substantially the same as that described in the previously mentioned Harned et al reference detects the ringing vibrations due to engine knock by means of a vibration sensor fixed on a component of engine 10, determines the severity of such vibrations with reference to the maximum knock that is still inaudible and generates a digital output signal which is low when such knock is acceptable and high when such knock is unacceptably high with reference to said maximum inaudible knock. Of course, other knock detectors could be substituted for the one specified as long as they either deliver, or could be modified to deliver, a digital output wherein a low output signals acceptability and a high output signals excessive knock.

The output of knock detector 34 is supplied through switch 21b to an up-down counter 35. A source of high signal voltage, shown as voltage source 36, which could be the normal vehicle battery or generator, is also connected to switch 21b such that switch 21b is adapted to connect knock detector 34 to up-down counter 35 when throttle valve 20 is in its wide open position and to connect voltage source 36 to up-down counter 35, as shown in FIG. 2, when throttle valve 20 is not in its wide open throttle position. The output of knock detector 34 is also provided to another up-down counter 38.

The output of 90-bit shift register 24 is connected through a divide-by-N counter 39 to the up-down counters 35 and 38 such that a down pulse or sudden drop in the output of shift register 24 from the high to low state, which corresponds to a spark pulse and the firing of one of the spark plugs 12, causes each of up-down counters 35 and 38 to count one count up or down, depending on the state of knock detector 34 and the position of switch 21b. Each of the up-down counters 35 and 38 is provided with a low limit of zero and an upper limit which can be predetermined, and, in this embodiment, is 16 for counter 35 and 4 for counter 38. Divide-by-N counter 39 passes only every Nth pulse from shift register 24 with N equal to eight in this embodiment. Naturally, the upper limit of up-down counter 35, which determines the maximum advance, the upper limit of up-down counter 38, which then determines the maximum retard and the number N in divide-by-N counter 39, which helps determine the rate of response of the system to changes in knock level, may all be changed from those values shown in this embodiment without departing from the scope of this invention.

Up-down counters 35 and 38 can be, in actuality, left-right shift registers. In operation, up-down counter 35 would comprise a 16-bit left-right shift register which, with a low input from knock detector 34, would load digital ones from the left and digital zeros from the right and shift all numbers one bit to the left for every trigger pulse from divide-by-N counter 39 when the input knock detector 34 or from voltage source 36 is high and one bit to the right for every trigger pulse from divide-by-N counter 39 when the signal from knock detector 34 is low. Up-down counter 38 is a 4 bit left-right shift register similar to counter 35, except that the loaded numbers are shifted to the right with a high input from knock detector 34 and the left with a low input from knock detector 34.

The count in either of up-down counters 35 or 38 is the number of digital ones loaded into it. Thus up-down counter 35 counts down to zero when the throttle valve 20 is not in its wide open position or when it is in its wide open position and the knock detector 34 is signalling excessive knock. Up-down counter 35 counts upward toward its maximum of 16 when throttle valve 20 is in its wide open position and knock detector 34 signals acceptable knock. Up-down counter 38, on the other hand, counts downward toward zero with acceptable knock and upward toward its upper limit with excessive knock from knock detector 34.

The count of up-down counter 35 is supplied to a down counter 42. Likewise the count of up-down counter 38 is supplied to a down counter 43. The output of shift register 24 is connected through delay means 44 to counters 42 and 43 to supply trigger pulses to load the counts in counters 35 and 38 into counters 42 and 43, respectively. Delay means 44 provide a delay of one or two microseconds to ensure that any change in the counts of up-down counters 35 and 38 occurs before the loading of the counts into counters 42 and 43 so that the latter have the most up-to-date information.

The output of delay means 29 is connected to down counter 42 and, through a divide-by-N counter 46 to down counter 43. In this embodiment, N in divide by N counter 46 can equal 4. The output of down counter 42 is connected to the other input of AND gate 30; and the output of down counter 43 is connected to one input of NAND gate 32. In operation, the down pulse from shift register 24, slightly delayed by delay means 44, causes the output count of up-down counter 35 to be loaded into down counter 42, switches the output of down counter 42 high and starts down counter 42 counting downward on the delayed pulses from delay means 29 from the count loaded in until zero is reached, at which point the output switches low again. The operation of down counter 43 is similar to that of down counter 42, with the count being loaded from counter 38 and the count pulses being supplied from divide by N counter 46 at only one per four degrees of crankshaft rotation.

Another gate 47 is provided which has an input from up-down counter 35 and an output to the other input of NAND gate 32 and is effective to provide a high input to NAND gate 32 when the count of up-down counter 35 is zero, corresponding to the spark retard mode, and a low input to NAND gate 32 when the count of up-down counter 35 is greater than zero, corresponding to the spark advance mode. Gate 47 could be a simple inverter responsive to the leftmost bit of the left-right shift register used for up-down counter 35, since this bit will be zero only when all other bits are zero.

The overall operation of the system will now be described. Assumming that engine 10 has been running for sometime with no excessive knock and only partly opened throttle, the system will be in the spark retard mode. Switches 21a and 21b will be in the position shown in FIG. 2; knock detector 34 will have a low output; up-down counters 35 and 38 will be at zero; OR gate 28 will be passing only one pulse for each degree of crankshaft rotation; normal spark generator 16 will be producing a wave form such as 16a in FIG. 3 or 16b in FIG. 4; NAND gate 32 will have a continual high output; and 90-bit shift register 24 will delay the output of normal spark generator 16 by precisely 90° of crankshaft rotation, with the result that the normal spark timing settings of the engine, with speed and vacuum advance, will prevail.

If excessive knock occurs, the output of knock detector 34 will go high; the next pulse from divide-by-N counter 39 will cause up-down counter 38 to count up one; the immediately following pulse from delay means 44 will cause the number "one" to be loaded into down counter 43; the output of down counter 43 will go high; the output of NAND gate 32 will go low; AND gate 25 will stop passing pulses from OR gate 28; and down counter 43 will count down from one to zero on the next pulse from divide-by-N counter 46, which will occur 4° of crankshaft rotation later. When down counter 43 reaches zero, the output to NAND gate 32 will once again go low and cause the output to AND gate 25 to go high, whereupon the pulses will once again be passed to 90-bit shift register 24.

Figure 4:
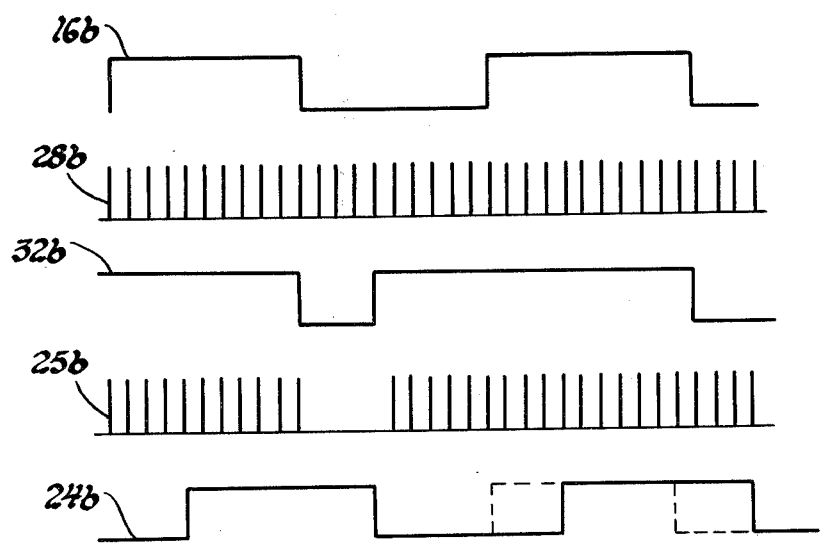
FIG. 4 shows wave forms of the output of a number of elements in the system of FIG. 2 in its spark retard mode.

The situation is that shown in FIG. 4 where wave form 32b shows the change in the output of NAND gate 32 and wave form 25b shows the interruption of pulses passed by AND gate 25. Wave form 24b in FIG. 4 shows the retarded spark pulse to be applied to the Schmitt trigger to cut off current in the coil and fire one of the spark plugs 12. This retard should reduce the level of knock as measured by knock detector 34.

Up-down counter 38 will continue to count up until knock as measured by knock detector 34 becomes acceptable or the upper limit is reached. In practice, the upper limit of up-down counter 38 would rarely be reached with excessive knock still present, and this portion of the system would prevent excessive knock under non-wide-open-throttle driving conditions.

Returning to the original assumed conditions, if throttle valve 20 is opened to its wide open position, switch 21a closes and switch 21b changes from the position shown in FIG. 2 to apply the output of knock detector 34 to up-down counter 35. If the change causes excessive knock to begin, up-down counter 35 remains at zero, gate 47 maintains a high input to NAND gate 32, and up-down counter 38 assumes control as described above.

Figure 3:
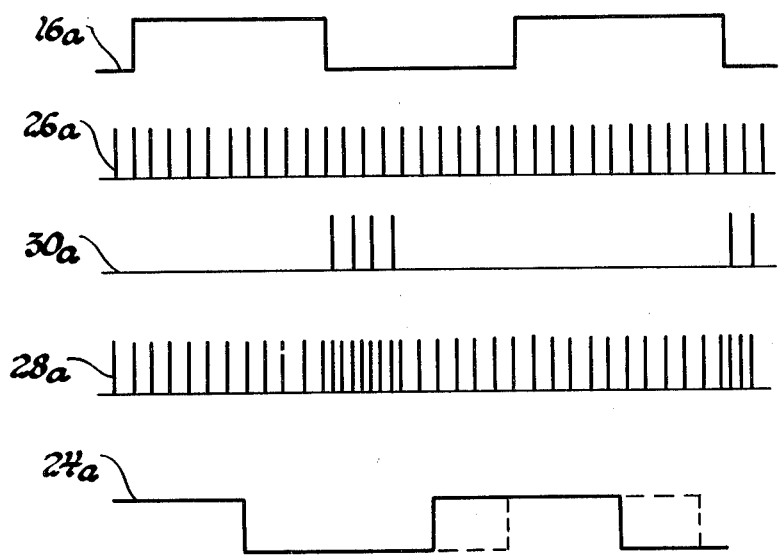
FIG. 3 shows wave forms of the output of a number of elements in the system of FIG. 2 in its spark advance mode.

If, however, knock remains acceptable, the system switches to the spark advance mode. Up-down counter 35 counts up one count at the next pulse from divide-by-N counter 39; and this count is loaded into down counter 42 at the next pulse from delay means 44. The output of down counter 42 goes high and causes AND gate 30 to pass a pulse from delay means 29 through switch 21a, OR gate 28 and AND gate 25 to shift register 24 before the output of down counter 42 goes low again. Assumming acceptable knock through three more pulses from divide-by-N counter 39, the count in up-down counter 35 will have reached four and the situation will be as shown in FIG. 3. While down counter 42 counts four of the delayed pulses 29 down to zero, the output of down counter 42 is high, thus allowing all four delayed pulses, shown in wave form 30a, to pass through to OR gate 28, where they are seen as extra pulses in wave form 28a. The resulting wave form 24a from shift register 24 shows a resulting advance of 4° in the spark pulse.

As long as a non-zero number appears in up-down counter 35, gate 47 will prevent the output of NAND gate 32 from going low and thus prevent any retard due to up-down counter 38. When up-down counter 35 has advance the spark timing, under wide open throttle operation, to the point where knock becomes excessive, it will itself begin to count downward and thus retard the spark back toward the normal spark timing. Thus, during wide open throttle, gate 47 gives up-down counter 35 exclusive control of variation from the normal spark timing unless knock levels are high enough that up-down counter 35 counts all the way back to zero, at which time the system will revert to the spark retard mode and up-down counter 38 will take over control. Likewise, switch 21a prevents up-down counter 35 from controlling at any time other than wide open throttle, thus giving control of the system during normal operation to up-down counter 38. Switch 21b provides an initial count of zero for up-down counter 35 to assure that the initiation of wide open throttle will always start spark timing at its normal setting.

It will be understood that the embodiment described is only one of many equivalent embodiments which will occur to those skilled in the art upon reading this specification. Therefore this invention should be limited only by the claims which follow.

The embodiments of the invention in which an exclusive property or privilege is claimed are defined as follows:

1. A spark timing system for an internal combustion engine having a crankshaft, a plurality of spark plugs to which ignition pulses are successively applied as the crankshaft rotates and fuel charge delivery apparatus including a throttle having a wide open position corresponding to the maximum rate of fuel charge delivery to the engine, comprising in combination:

first means responsive to engine knock and effective to generate an excessive knock output signal when the knock as detected by said first means exceeds a reference and an acceptable knock signal when the knock as detected by said first means does not exceed the reference;

a first counter responsive to the first means and triggered by selected ignition pulses to increase its count when the first means generates an excessive knock signal and to decrease its count when the first means generates an acceptable knock signal;

second means to generate a spark timing pulse for each spark ignition event, each said pulse having a predetermined timing determined by mechanism not directly responsive to engine knock;

third means responsive to the second means to generate an ignition pulse for each spark timing pulse and effective normally to retard each ignition pulse from each spark timing pulse by a first constant angle of crankshaft revolution plus an additional second angle of crankshaft revolution proportional to the count of the first counter;

a second counter responsive to the first means and triggered by selected ignition pulses to decrease its count when the first means generates an excessive knock signal and to increase its count when the first means generates an acceptable signal;

fourth means responsive to the throttle and second counter and effective, when the throttle is in its wide open position and the count of the second counter is greater than zero, to override the third means and generate an ignition pulse for each spark timing pulse, each said ignition pulse being retarded from its respective spark timing pulse by the constant first angle of crankshaft revolution less a third angle of crankshaft revolution proportional to the count of the second counter, whereby spark timing may be advanced from a normal spark timing, as determined by the spark timing pulses and the constant first angle of crankshaft revolution, during wide open throttle, to increase maximum engine power but is retarded from the normal or advanced timing as necessary to limit engine knock.

2. A spark timing system for an internal combustion engine having a crankshaft, a plurality of spark plugs to which ignition pulses are successively applied as the crankshaft rotates and fuel charged delivery apparatus including a throttle having a wide open position corresponding to the maximum rate of fuel charge delivery to the engine, comprising in combination:

first means responsive to engine knock and effective to generate an excessive knock output signal when the knock as detected by said first means exceeds a reference and an acceptable knock signal when the knock as detected by said first means does not exceed the reference;

a first counter responsive to the first means and triggered by selected ignition pulses to increase its count when the first means generates an excessive knock signal and to decrease its count when the first means generates an acceptable knock signal;

second means effective to generate a spark timing pulse for each spark ignition event, each said spark timing pulse having a predetermined timing determined by mechanism not directly responsive to engine knock;

third means responsive to crankshaft rotation to generate a first train of pulses at a rate proportional to the speed thereof;

fourth means responsive to the second means to generate an ignition pulse for each spark timing pulse and further being responsive to the third means to count pulses of the first train and retard each ignition pulse from its respective spark timing pulse by a fixed number of pulses of the first train;

fifth means responsive to the first counter and the fourth means to normally interrupt the first train of pulses upon the occurrence of each ignition pulse for a number of pulses proportional to the count on the first counter;

a second counter responsive to the first means and triggered by selected ignition pulses to decrease its count when the first means generates an excessive knock signal and to increase its count when the first means generates an acceptable knock signal;

sixth means responsive to the third means to generate a second train of pulses corresponding to but not coinciding with the first train of pulses;

seventh means responsive to the throttle, second counter and fourth means and effective, when the throttle is in its wide open position and the count of the second counter is greater than zero, to prevent the interruption of the first train of pulses by said fifth means and, upon the occurrence of each ignition pulse, to add pulses from the second pulse train to those of the first pulse train for counting by the fourth means, the number of pulses so added being proportional to the count of the second counter, whereby spark timing may be advanced from a normal spark timing, as determined by the spark timing pulses, during wide open throttle, to increase maximum engine power, but is retarded from the normal or advanced timing as necessary to limit engine knock.

* * * * *